Patented Oct. 9, 1923.

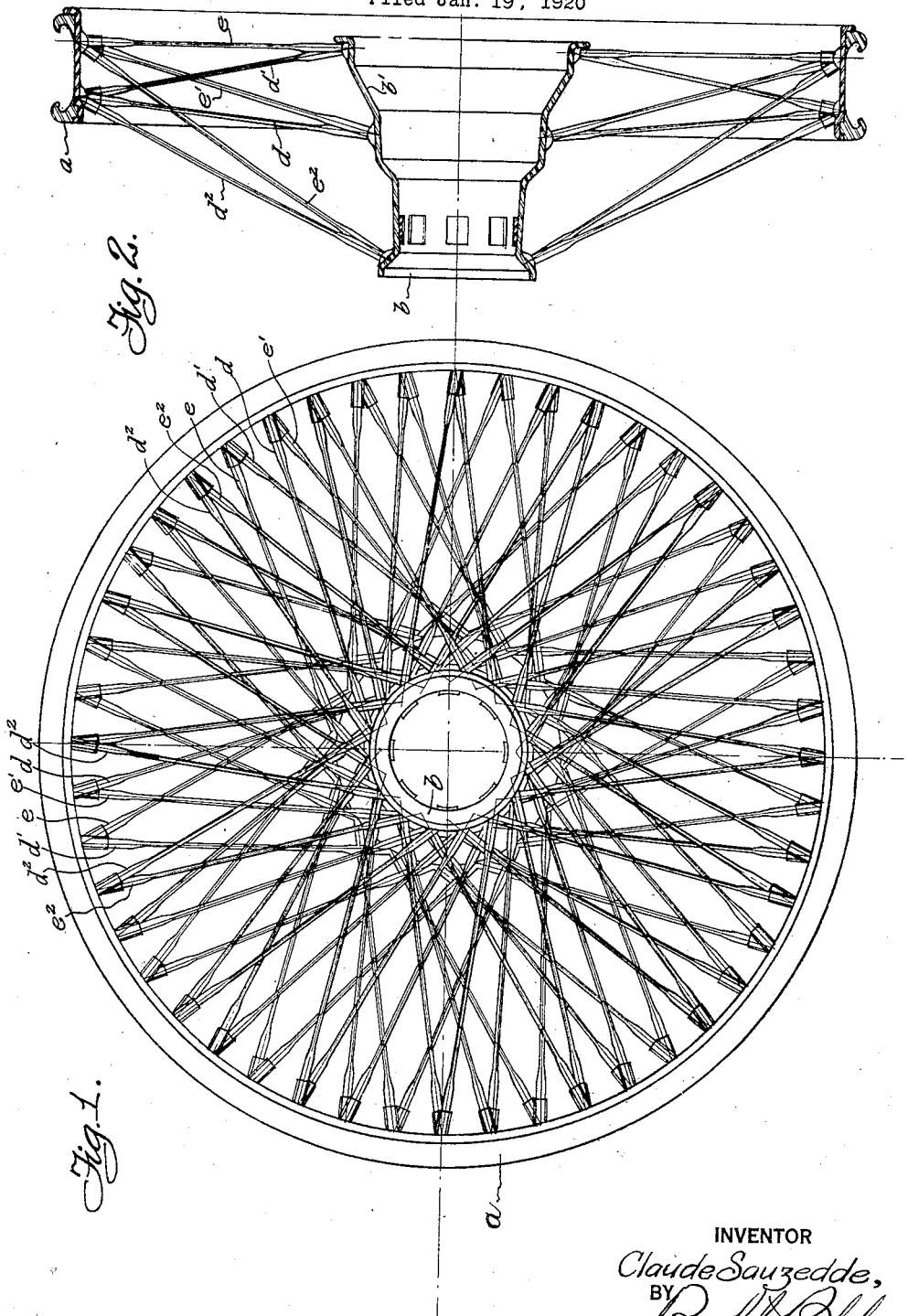

1,469,822

UNITED STATES PATENT OFFICE.

CLAUDE SAUZEDDE, OF DETROIT, MICHIGAN.

WIRE-WHEEL CONSTRUCTION.

Application filed January 19, 1920. Serial No. 352,507.

*To all whom it may concern:*

Be it known that I, CLAUDE SAUZEDDE, a citizen of France, residing at Detroit, in the county of Wayne and State of Michigan, have invented certain new and useful Improvements in Wire-Wheel Constructions, of which the following is a specification, reference being had therein to the accompanying drawings.

This invention relates to improvements in wire wheel construction, pertaining more particularly to the general arrangement of the spoke connections between the rim and hub of the wheel.

Wire wheel construction of various types have been used extensively as a substitute for the wooden spoke form of wheel, the use being with varying degrees of success. However, each of the different types employed have carried objectionable features, these being accepted for one reason or another, it being, however, generally appreciated that all of them fell far short of producing the results desired, especially where the loads were of considerable value.

The present invention is designed to meet these conditions, and produce a construction capable of successfully and properly supporting the load weights even though of large value and at the same time provide a construction which will maintain its general configuration in the presence of the various strains or stresses to which a wheel of this type is given under service conditions, whether these strains or stresses be due to radial loads, side thrust conditions, torque effects, or torsion strains.

A further object is to produce a construction which is of symmetrical arrangement and thus equalize the stresses throughout, enabling the wheel to provide for a more uniform service.

A further object is to provide a construction which is simple and efficient in operation, durable in construction, and which can be manufactured at a relatively low cost.

To these and other ends, therefore, the nature of which will be readily understood as the invention is hereinafter disclosed, said invention consists in the improved construction and combination of parts, hereinafter more fully described, illustrated in the accompanying drawings, and more particularly pointed out in the appended claims.

In the accompanying drawings, in which similar reference characters indicate similar parts in each of the views, Figure 1 is a face view of a wheel carrying the general spoke arrangement illustrative of the general invention;

Fig. 2 is a sectional view taken diametrically through a wheel.

In the drawing, —$a$— indicates the rim of a wheel and —$b$— the hub, these being more or less illustrative, it being understood, of course, that changes in configuration of either or both may be had to meet individual preference. The form of the hub —$b$— shown is that disclosed in a companion application; in this particular form the face indicated ($b'$), forms a seating face when the wheel is in position, and since this face is intermediate the width of the rim, it will be readily understood that radial loads are applied in proper manner.

One of the difficulties present in the general wire wheel constructions is the fact that, there is generally a variation in the number of spokes which may be connected in the individual circles of either rim or hub. For instance, the rim generally has the spoke sockets for points of connection arranged in two circular rows or approximately in row form. The type of wheel construction generally employed is that known as the triple lacing type in which two radial spokes are employed and a third spoke arranged inclined thereto, the radial spokes being designed to take care of radial load conditions, while the inclined spoke is presumed to take care of the side thrust. As a result, one of the rows of the rim has a greater number of spokes than the other, thus destroying uniform effect in action. This is also true with respect to the hub, where one row carries a greater number of spokes than the other. While this unequal distribution of spokes is avoided where the inclined spokes are arranged in opposite directions and thus providing practically the effect of a four spoke construction, the remaining difficulties present in structures of this type are still present. This will be understood from the fact that in order to provide for proper radial load support, the radial spokes should extend approximately parallel to each other, and this practically limits the spacing of the inner edge of the spokes on the hub, due to the spacing of the outer ends of the spokes on the rim. Where this four-spoke type is employed under such conditions, the amount of support on the hub is more or less limited. In some cases this has been attempted to be met by only employing one radial spoke and carrying the other radial spoke out to the outer end of the hub, thus placing it more or less inclined to a material degree; this tends to disturb a uniform radial load application, owing to the fact that the main portion of the load is applied, on the single row of spokes.

In meeting the conditions, I preferably arrange the spokes in two groups, each group having the outer ends of its spokes located in the same general circle of the rim, thus setting up the conditions of a two row formation so far as the rim itself is concerned. For the purpose of explanation, I have indicated the spokes of one group as —$d$—, —$d'$—, —$d^2$—, while the spokes of the other group are indicated at —$e$—, —$e'$— and —$e^2$—, each group, being shown as comprising three sets of spokes. Obviously, the circle in which the outer ends of the spokes may be located may vary from a true circle.

The inner ends of these spokes are shown as arranged in three circular rows, spokes —$d'$— and —$e$— being located on the inner circle of the hub, spokes —$d^2$— and —$e^2$— being located on the outer circle of the hub, while spokes —$d$— and —$e'$— are located on an intermediate circle of the hub, the latter being spaced from the inner circle by the face —$b'$—, so that spokes —$d$— and —$e$— provide for true radial load support action, these spokes approaching parallelism, since the spokes of the outer circle, are serviceable in producing the resistance against side thrust action.

As will be seen, each of the three rows or circles of the hub carries spokes from each of the two rows or circles of the rim, the result being that each group of spokes has the inner ends of the spokes located in three circles, this being true with both groups shown. It will therefore be seen that each of the circles of the hub, is connected in both circles of the rim, while each circle of the rim is connected with all of the circles in the hub.

Obviously, this general arrangement provides for each of the rim circles having the same number of spoke ends, while each of the hub circles also has an equal number of spoke ends, the number of spoke ends in a circle of the rim, however, being greater than those of a circle of a hub, but this difference in numbers simply serves to provide for better distribution of stresses applied and producing a more uniform application regardless of the direction in which the stresses are applied.

The spokes are preferably arranged tangentially to the hub, the result being that, as seen in Fig. 1, the spoke arrangement provides for symmetrical and uniform support throughout the area of the wheel, the wheel not carrying the multitude of open spaces which vary materially in character such as produced by the general arrangement now employed.

From the above, it will be understood that one of the main essentials of the invention is that the number of circles or rows of the rim shall differ from the number of rows or circles of the hub, the latter being preferably greater in number than the number of those on the rim. In the particular form shown the rim is provided with two circles or rows while the hub is provided with three of such circles or rows. It will be understood, of course, that this may be varied, as by increasing the number of hub rows or by increasing the number of both rim and hub rows, this depending upon the service to which the wheel is to be put. The particular form shown is applicable for carrying comparatively high loads, but it will be understood that if greatly increased loads may be encountered, it may be advisable to increase the number of rows either on the hub or on the hub and rim.

Another feature is that adjacent spokes are tangential to the hub and at the same time are inclined relative to each other. And this holds true with respect to the spokes of a group and generally to the spokes of one group relative to the spokes of the other group. As a result, the structure is one in which the spokes are "laced" in a manner to provide for maximum efficiency and strength, the arrangement preventing any torque effects from producing any material torsional strains in the presence of traction conditions at the rim, the spoke arrangement being such as to provide for maximum mutual supporting action of spokes relative to each other to meet all conditions of service.

While I have herein shown and described one or more ways in which the invention can be carried into effect, it will be readily understood that the disclosure is more or less illustrative and changes and modifications therein may be found desirable in meeting the exigencies of use, and I desire to be understood as reserving the right to make any and all such changes or modifications therein as may be found desirable or necessary in so far as the same may fall within the spirit or scope of the invention as expressed in the accompanying claims, when broadly construed.

Having thus described my invention, what I claim as new is:—

1. In a wire wheel construction, a hub, a rim, and spokes connecting the hub and rim, said spokes being arranged in two groups, with each group having its spoke ends located approximately on a circle of the rim independent of the other group, a group having the hub ends of its spokes located on more than two approximate circles of the hub, and with the hub circles spaced apart not less than the spacing of the radial load spokes of both groups.

2. In a wire wheel construction, a hub, a rim, and spokes connecting the hub and rim, said spokes being arranged in two groups, with each group having its spoke ends located approximately on a circle of the rim independent of the other group, a group having the hub ends of its spokes located on more than two approximate circles of the hub, with each hub circle carrying spokes from each group.

3. In wire wheel construction, a hub, a rim, and spokes connecting the hub and rim, said spokes being arranged in two groups, with each group having its spoke ends located approximately on a circle of the rim independent of the other group each group having the hub ends of its spokes located on more than two approximate circles of the hub and with the hub circles spaced apart not less than the spacing of the radial load spokes of both groups.

4. In wire wheel construction, a rim, a hub, and spokes connecting the hub and rim, said spokes being connected to the rim in two circular rows and to the hub in more than two circular rows, each row of the rim having a similar number of spokes, a section taken longitudinally of the hub of the wheel presenting spokes of one rim row extending in directions angular to the direction of extension of spokes of another rim row with the directions of extension of such spokes of the several rows intersecting between the hub and rim.

5. In wire wheel construction, a rim, a hub, and spokes connecting the hub and rim, said spokes being connected to the rim in two circular rows and to the hub in more than two circular rows, each row of the hub having a similar number of spokes, a section taken longitudinally of the hub of the wheel presenting spokes of one rim row extending in directions angular to the direction of extension of spokes of another rim row with the directions of extension of such spokes of the several rows intersecting between the hub and rim.

6. In wire wheel construction, a rim, a hub, and spokes connecting the hub and rim, said spokes being connected to the rim in two circular rows and to the hub in more than two circular rows, the number of spokes in a rim row differing from the number of spokes in a hub row, a section taken longitudinally of the hub of the wheel presenting spokes of one rim row extending in directions angular to the direction of extension of spokes of another rim row with the directions of extension of such spokes of the several rows intersecting between the hub and rim.

7. In wire wheel construction, a rim, a hub, and spokes connecting the hub and rim, said spokes being connected to the rim in two circular rows and to the hub in more than two circular rows, the number of spokes in a rim row differing from the number of spokes in a hub row with each row of the hub or rim having a similar number of spoke ends, a section taken longitudinally of the hub of the wheel presenting spokes of one rim row extending in directions angular to the direction of extension of spokes of another rim row with the directions of extension of such spokes of the several rows intersecting between the hub and rim.

8. In wire wheel construction, a rim, a hub, and spokes connecting the rim and hub, said spokes being connected to the rim in at least two circular rows and connected to the hub in rows greater in number than the rim rows, the assembly having a spoke of each rim row located in the same hub row, a section taken longitudinally of the hub of the wheel presenting spokes of one rim row extending in directions angular to the direction of extension of spokes of another rim row with the directions of extension of such spokes of the several rows intersecting between the hub and rim.

9. In wire wheel construction, a rim, a hub, and spokes connecting the rim and hub, said spokes being connected to the rim in at least two circular rows and connected to the hub in rows greater in number than the rim rows, the assembly having a spoke of each rim row located in the same hub row, and with the number of spokes in a hub row approximately equally divided between the rim rows, a section taken longitudinally of the hub of the wheel presenting spokes of one rim row extending in directions angular to the direction of extension of spokes of another rim row with the directions of extension of such spokes of the several rows intersecting between the hub and rim.

10. In wire wheel construction, a rim, a hub, and spokes connecting the rim and hub, said spokes being connected to the rim in at least two circular rows, and connected to the hub in a greater number of rows, with each hub row having a spoke from each rim row.

11. In wire wheel construction, a rim, a hub, and spokes connecting the rim and hub, said spokes being connected to the rim in at least two circular rows, and connected to the hub in a greater number of rows, with each hub row having a spoke from each rim row, the spokes of a hub row being substantially equally divided between the rim rows.

12. In wire wheel construction, a rim, a hub, and spokes connecting the rim and hub the spoke arrangement providing a number of rows of spokes of the rim differing from the number of rows of spokes of the hub, a section taken longitudinally of the hub of the wheel presenting spokes of one rim row extending in directions angular to the direction of extension of spokes of another rim row with the directions of extension of such spokes of the several rows intersecting between the hub and rim.

13. In wire wheel construction, a rim, a hub, and spokes connecting the rim and hub, the spoke arrangement providing at least two rows of spokes on the rim and a greater number of rows on the hub, a section taken longitudinally of the hub of the wheel presenting spokes of one rim row extending in directions angular to the direction of extension of spokes of another rim row with the directions of extension of such spokes of the several rows intersecting between the hub and rim.

14. In wire wheel construction, a rim, a hub, and spokes connecting the rim and hub, the spoke arrangement providing at least two rows of spokes on the rim and a greater number of rows on the hub with the number of spokes of the rim approximately the same in each row, a section taken longitudinally of the hub of the wheel presenting spokes of one rim row extending in directions angular to the direction of extension of spokes of another rim row with the directions of extension of such spokes of the several rows intersecting between the hub and rim.

15. In wire wheel construction, a rim, a hub, and spokes connecting the rim and hub, the spoke arrangement providing at least two rows of spokes on the rim and a greater number of rows on the hub with the number of spokes of either rim or hub approximately equally divided between the rows thereof, a section taken longitudinally of the hub of the wheel presenting spokes of one rim row extending in directions angular to the direction of extension of spokes of another rim row with the directions of extension of such spokes of the several rows intersecting between the hub and rim.

In testimony whereof I affix my signature in the presence of two witnesses.

CLAUDE SAUZEDDE.

Witnesses:
  KARL H. BUTLER,
  HORACE G. SEITZ.